United States Patent
Leekkala et al.

(10) Patent No.: US 10,581,938 B2
(45) Date of Patent: Mar. 3, 2020

(54) SYSTEMS AND METHODS FOR MULTI-MODAL SYNCHRONIZATION AND INTERACTION

(71) Applicant: Walmart Apollo, LLC, Bentonville, AR (US)

(72) Inventors: Sridhar Leekkala, Bentonville, AR (US); Nanda Kishore Reddy, Bengaluru (IN)

(73) Assignee: WALMART APOLLO, LLC, Bentonville, AR (US)

(*) Notice: Subject to any disclaimer, the term of this patent is extended or adjusted under 35 U.S.C. 154(b) by 247 days.

(21) Appl. No.: 15/838,786

(22) Filed: Dec. 12, 2017

(65) Prior Publication Data

US 2018/0167425 A1  Jun. 14, 2018

Related U.S. Application Data

(60) Provisional application No. 62/432,995, filed on Dec. 12, 2016.

(51) Int. Cl.
| | | |
|---|---|---|
| *H04L 29/06* | (2006.01) | |
| *H04L 12/58* | (2006.01) | |
| *G06F 16/9535* | (2019.01) | |
| *H04L 29/08* | (2006.01) | |
| *G06F 16/00* | (2019.01) | |
| *H04W 4/60* | (2018.01) | |

(Continued)

(52) U.S. Cl.
CPC ............ *H04L 65/403* (2013.01); *G06F 16/00* (2019.01); *G06F 16/9535* (2019.01); *H04L 51/043* (2013.01); *H04L 67/26* (2013.01); *G06F 3/01* (2013.01); *H04L 29/06047* (2013.01); *H04L 67/10* (2013.01); *H04W 4/50* (2018.02); *H04W 4/60* (2018.02)

(58) Field of Classification Search
CPC ............ H04L 29/06047; H04L 51/043; H04L 65/403; H04L 67/10; H04L 67/26; H04L 12/1859; H04L 41/12; H04L 51/046; H04W 4/50; H04W 4/60; G06Q 10/00; G06Q 30/02; H04N 21/23617
See application file for complete search history.

(56) References Cited

U.S. PATENT DOCUMENTS

| | | |
|---|---|---|
| 9,049,341 B2 | 6/2015 | Yang |
| 9,235,312 B2 | 1/2016 | Dura et al. |
| 9,559,995 B1 * | 1/2017 | Wong .................... H04L 51/046 |

(Continued)

OTHER PUBLICATIONS

Alwaysonoc; Mobile Web Conference Hosting & Screen sharing on Android & iPad using AlwaysOnPC (Zoho example); 2011, retrieved Nov. 20, 2018, available at https://www.youtube.com/watch?v=cUz_t6jNtW0.

(Continued)

*Primary Examiner* — Le H Luu
(74) *Attorney, Agent, or Firm* — Patterson Thuente Pedersen, P.A.

(57) ABSTRACT

Embodiments relate to multi-modal synchronization and interaction systems and methods. In a system that includes a plurality of display devices, web applications ("apps") can synchronize filters and therefore views on the devices. Embodiments of the systems and methods thereby provide synchronization not just of a display but also of user interaction with the display.

19 Claims, 3 Drawing Sheets

(51) Int. Cl.
*G06F 3/01* (2006.01)
*H04W 4/50* (2018.01)

(56) References Cited

U.S. PATENT DOCUMENTS

| | | | | |
|---|---|---|---|---|
| 2008/0089264 | A1* | 4/2008 | Kim | H04L 12/1859 370/312 |
| 2009/0249451 | A1* | 10/2009 | Su | G06F 21/6218 726/5 |
| 2011/0154220 | A1* | 6/2011 | Chunilal | G06Q 10/00 715/751 |
| 2014/0181887 | A1* | 6/2014 | Moon | H04N 21/23617 725/133 |
| 2015/0199313 | A1* | 7/2015 | Barraclough | G06F 3/01 715/716 |
| 2016/0343037 | A1* | 11/2016 | Nicholas | G06Q 30/02 |
| 2016/0371709 | A1* | 12/2016 | Browning | G06F 16/285 |
| 2017/0012993 | A1* | 1/2017 | Lieu | G06F 16/9535 |
| 2017/0339020 | A1* | 11/2017 | Khanna | H04L 41/12 |

OTHER PUBLICATIONS

Microsoft; Collaboration just got easier: Real-time co-authoring now available in Office Web Apps; 2013, retrieved Nov. 20, 2018, available at https://www.microsoft.com/en-us/microsoft-365/blog/2013/11/06/collaboration-just-got-easier-real-time-co-authoring-now-available-in-office-web-apps/.

Business2community; Share Your Desktop on Skype—Without Paying For Premium; 2012; retrieved Nov. 20, 2018, available at https://www.business2community.com/tech-gadgets/share-your-desktop-on-skype-without-paying-for-premium-0333477#FVJ3d66iHvqzHor8.97.

Team Viewer, retrieved Nov. 20, 2018, available at https://www.blizz.com/en.

What is kaazing.io?, retrieved Nov. 23, 2018, available at https://kaazing.com/kaazing.io/doc/.

Holistic Communications; How to use Screen Share Controls in Zoom online meetings, retrieved Nov. 20, 2018, available at https://www.youtube.com/watch?v=2IZK0X4xMf4.

\* cited by examiner

SYSTEMS AND METHODS FOR MULTI-MODAL SYNCHRONIZATION AND INTERACTION

RELATED APPLICATION

The present application claims the benefit of U.S. Provisional Application No. 62/432,995 filed Dec. 12, 2016, which is incorporated herein by reference in its entirety.

TECHNICAL FIELD

The present disclosure relates generally to content communication and display, and more particularly to synchronizing access to and display of customized information in an interactive, multi-user system.

BACKGROUND

Technological advancements continue to provide new opportunities for business team members to share information and collaborate. Nevertheless, it still can be difficult or impossible for team members working on different devices to share customized information in efficient and useful ways. Conventional approaches are expensive, time-consuming, or incomplete, at least in that while they facilitate the sharing of a view, they do not enable further and selective interaction with and customization of that view by multiple team members simultaneously. Therefore, opportunities exist for improvements and new solutions in this area.

SUMMARY

Embodiments relate to systems and methods for multi-modal synchronization and interaction. In one embodiment, a multi-modal interaction system comprising: a plurality of display devices, each display device comprising a web application and a screen on which information accessed via the web application is displayed, wherein the information displayed on the screen is customized by a plurality of user selectable filters that affect at least one of a source or type of data displayed as the information; a web application server communicatively coupled with the web application of each of the plurality of display devices; and a content broadcasting server communicatively coupled with the web application of each of the plurality of display devices, wherein the content broadcasting server is configured to receive a subscription request from at least one of the plurality of display devices for another one of the plurality of display devices, receive information related to ones of the plurality of user selectable filters selected on the another one of the plurality of display devices, and broadcast the received information for application to the information on the at least one of the plurality of display devices, wherein both the ones of the plurality of user selectable filters selected on the another one of the plurality of display devices and the received information applied to the information on the at least one of the plurality of display devices are independently customizable by the plurality of user selectable filters.

In one embodiment, a method of providing multi-modal interaction in a system comprising a plurality of display devices, the method comprising: receiving, by a content broadcasting server, a subscription request from at least one of a plurality of display devices for another one of the plurality of display devices; receiving, by the content broadcasting server, information related to ones of the plurality of user selectable filters selected on the another one of the plurality of display devices, wherein the plurality of user selectable filters relate to at least one of a source or type of data displayed; and broadcasting the received information for application to information on the at least one of the plurality of display devices, wherein both the ones of the plurality of user selectable filters selected on the another one of the plurality of display devices and the received information applied to the information on the at least one of the plurality of display devices are independently customizable by the plurality of user selectable filters.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures.

Figure 1:
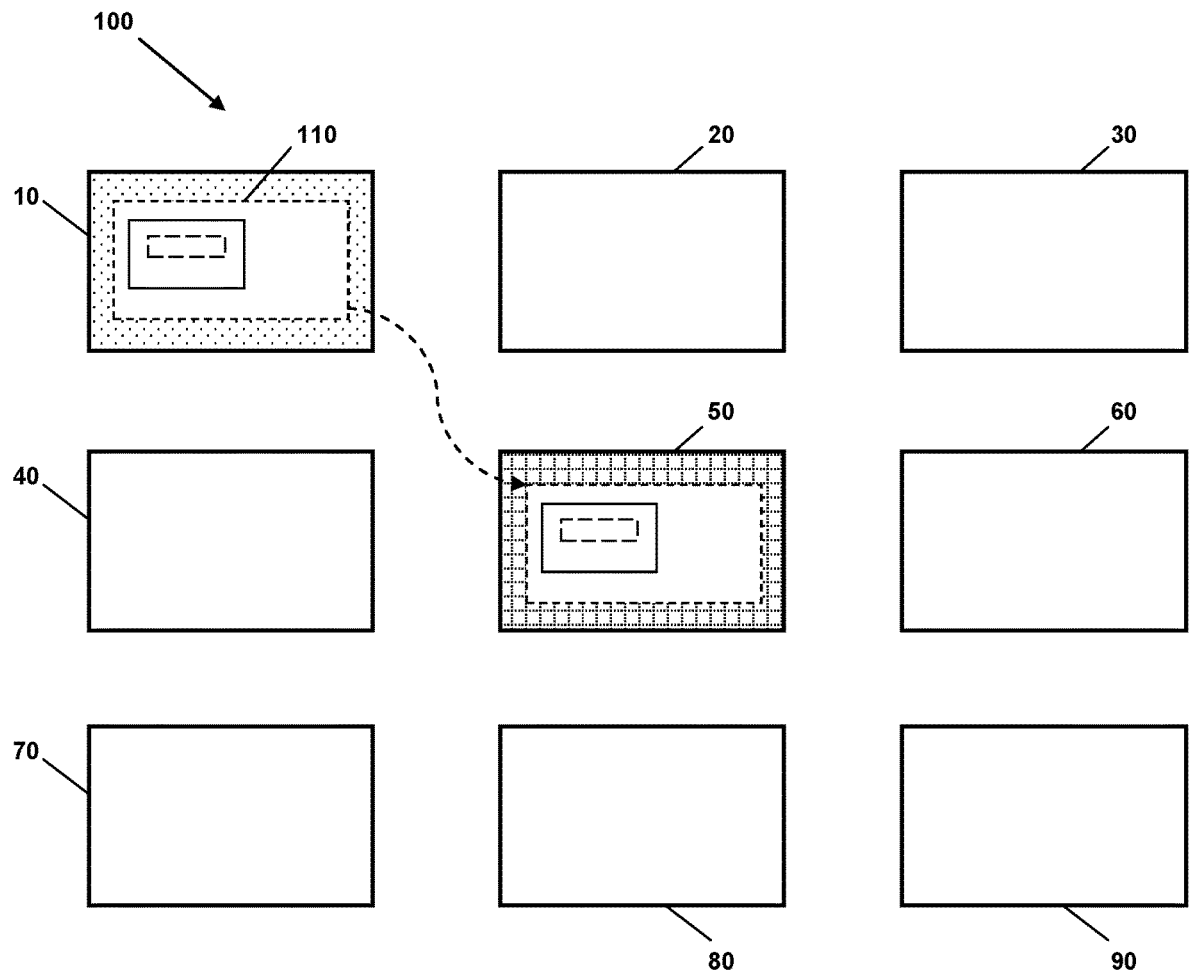
FIG. 1 is a block diagram of a plurality of display devices according to an embodiment of a multi-modal synchronization and interaction system.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

"Data Cafés" are unique internal business collaboration rooms in which team members can interact with visualized analytics to help them research their business and make efficient decisions that lead to actions. Data Cafés can include multiple television or computer screens (e.g., 10-15 screens, or fewer or more) on which team members can view and interact with network, business or market performance information.

Various filters, and combinations of filters, can be user-selected on a first screen to customize the view and information displayed. For example, a user may select a merchandise view, then a location view, to drill down to the specific data desired. The user may want to share the particular set of selected filters as customized by the user with another user on a second screen (or with a second screen used by the same device, or with multiple other users on multiple additional screens, etc.), which enables the other user or second screen to apply the same set of filters to whatever view is selected on the second screen. For example, a first user may select a merchandise view and apply filters A and B on a first device, and then the first user may wish to share the selected filters A and B so that the filters can be applied to the location view on a second screen of a second user. Conventional approaches require sharing a single view, which is distinct, or necessitate either manual setting (which is time-consuming, error-prone and cumbersome) or hardware solutions (which are very expensive).

A Data Café is one example of a setting in which users may want to share filters, selections and other settings (generally referred to herein as "filters") of the device on which they are working in a way that enables other users to apply, interact with and continue to selectively and independently customize the filters and view on other devices. Though Data Cafés are used herein as an example setting, none of the embodiments are limited to use in such a setting.

Referring to FIG. 1, a system 100 comprising a plurality of devices 10, 20, 30, 40, 50, 60, 70, 80 and 90 is depicted. Though nine devices are depicted in system 100 of FIG. 1, other embodiments can comprise more or fewer devices (e.g., as few as two devices, or as many as tens, hundreds or more devices). Each device 10-90 can comprise any of a computer, laptop, smartphone, smartwatch or other wearable device, tablet, television, or other device via which information is viewable on an integrated screen or projectable onto a separate screen or other viewing surface (e.g., a computer communicatively coupled with a projector). Each device 10-90 typically comprises at least one user input/output (I/O) component, such as a keyboard, mouse, touchscreen, voice recognition system, camera, gesture recognition system and/or other component, which can be integrally formed or communicatively coupled (e.g., via WIFI, BLUETOOTH, near-field communication or NFC) with the screen or other viewable portion of the device 10-90.

Devices 10-90 can be arranged locally (e.g., in the same room or facility) or geographically distributed (e.g., located in different buildings, cities, states or countries). In one embodiment, device 10-90 are used in a Data Café, which can be a local or distributed setting internal to a business, corporation or other entity and in which a plurality of devices 10-90 communication with one another. Each device 10-90 is communicatively coupled with the other devices, such as via a local or wide area network. These networks can include an intranet, the internet, and/or another open or closed communications network. In one example embodiment, each device 10-90 is communicatively coupled to the internet, either wirelessly or wired.

Figure 2:
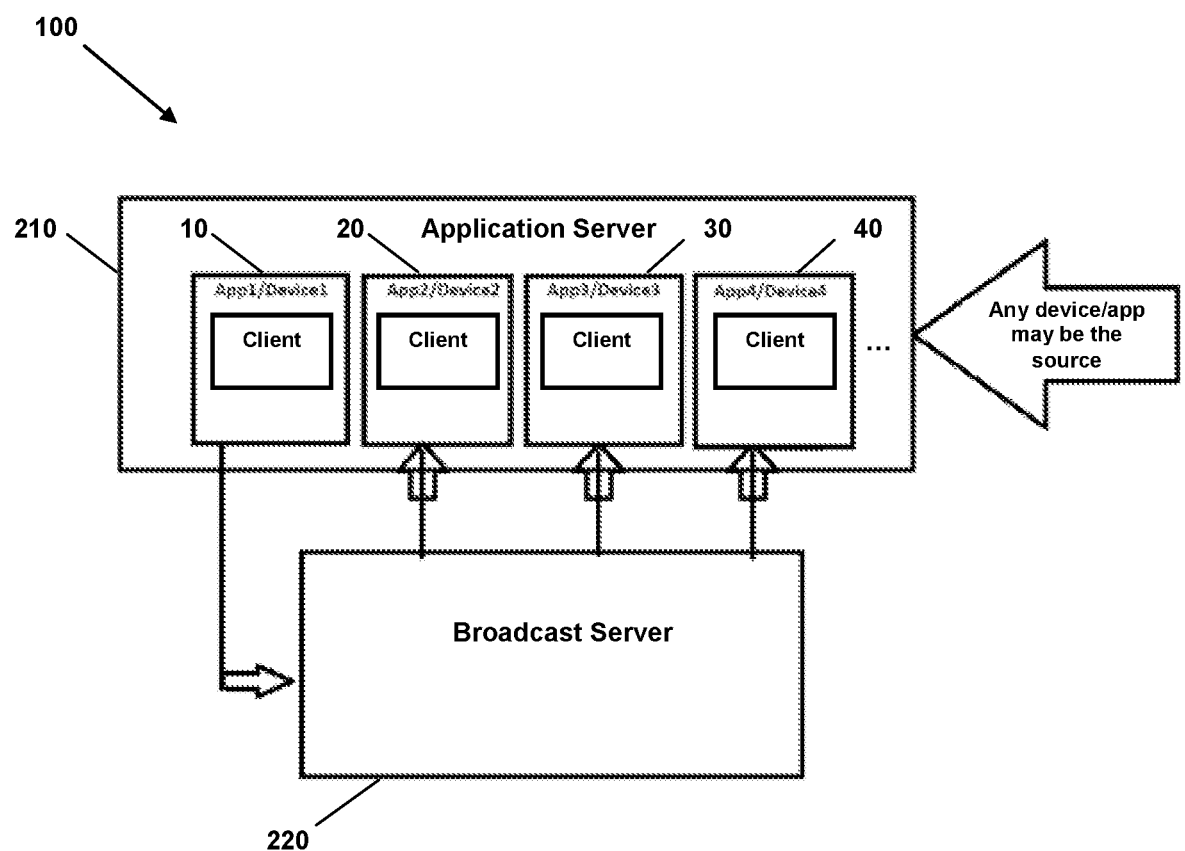
FIG. 2 is a block diagram of an embodiment of a multi-modal synchronization and interaction system.

Referring also to FIG. 2, each device 10-90 comprises an individual instance of at least one application, or "app" (App1, App2, App3, App4). For convenience but not limitation, only four devices 10, 20, 30, 40, and only a single app App1, App2, App3, App4 on each device 10-40, are depicted in FIG. 2. In one embodiment, each app App1, App2, App3, App4 is a web-based application, such as an HTML-based AngularJS application. As previously mentioned, each app App1, App2, App3, App4 is an individual instance of an application installed and running on each device 10-40. Each app App1, App2, App3, App4 relies on content from other screens or applications of the particular device 10-40 on which it is installed. Put another way, each app App1, App2, App3, App4 is not merely one that provides a portal to a common resource or view, as is done in conventional multi-device screen sharing arrangements, but rather one that enables sharing of filters, selections and other settings among multiple devices to provide highly customized views and information among the multiple devices, in ways that enable users of each device to apply the filters, selections and other settings to their own selected view (which may be different from the view on the source or other devices) and further manipulate and locally edit the view with shared filters, selections and other settings applied. In one embodiment, a user of each of devices 10-40 must be logged into system 100 via App1, App2, App3 and App4, respectively. In other embodiments, additional or alternative access and/or user or device authentication methodologies can be used.

In embodiments, the content from other screens or applications on each device 10-40 can comprise data and information that can be selectively manipulated for customized display on a particular device 10-40, such as by various filters, selections, settings and other tools available in one or more of the applications of the device 10-40. In this way, a user of a particular device 10 can drill down to particular data to produce a desired view, such as a merchandise view related to performance of a particular product line in a particular market with particular filters selected or deselected. The customized selection of filters and other settings on device 10, regardless of the underlying view to which they are applied on device 10, then can be broadcast to any others of devices 20-90 subscribing to device 10 or content thereof. Any and all devices in system 100 can be device 10, i.e., the "source device" of content that is broadcast.

In embodiments, content subscriptions can be device-specific, application-specific, client-specific, user-specific, or defined in some other way. Subscriptions from a first device in system 100 to a second device in system 100 may be communicated as requests that must be approved or accepted by the second device. Still other restrictions and qualifiers can be placed on subscriptions in various embodiments, such that subscriptions, content and access to some or all data within system 100 can be managed appropriately (e.g., according to corporate or other institutional rules or practices).

In one embodiment, the apps App1, App2, App3, App4 are in communication with and managed by a web application server 210. In one embodiment, application server 210 comprises an Apache Tomcat server. Application server 210 is communicatively coupled with a broadcast server 220, which in turn is communicatively coupled with each device 10-40. In one embodiment, broadcast server 220 comprises a JavaScript server such as a Node.js server, and devices 10-40, server 210 and server 220 communicate with another using a web communications protocol, such as WebSockets in one embodiment. In addition to the example Apache Tomcat and Node.js servers and WebSockets protocol, other software components and communications protocols can be used in embodiments of system 100, including Angular.js, Html5, and client-side libraries, all of which can be open source components.

Broadcast server 220 is configured to receive content (e.g., selected filters) from a source device (e.g., device 10 and App1 in FIG. 2) via application server 210 and, in turn, broadcast that content to any other devices of system 100 that have subscribed to the source device. In embodiments, users of the devices 10-40 can subscribe to the content of other devices via their apps App1, App2, App3, App4. In this way, device 10, via application server 210 and broadcast server 210, can broadcast content to any second or subsequent device and app that is subscribed to the content or view of device 10. In one embodiment, the content is broadcast on demand; i.e., a user of device 10 initiates broadcasting of content, or a user of another device 20, 30, 40 initiates a request for broadcasting of content. In other embodiments, the content is broadcast in real time. In still other embodiments, content is broadcast in real time after a user of the source device first initiates broadcasting. This provides display of the same particular view as customized by filters and other tools available to a user via the various applications (e.g., App1 on device 10) in the apps of other devices in system 100.

In one example, and referring to FIG. 1, a user of device 10, working in one or more apps, selects a combination of filters 110 to apply to a particular view (represented by stippling) of desired data on device 10. Filters 110 are depicted in FIG. 1 as layered boxes for illustrative purposes only; in reality, the filters can be data-driven and/or view-based, such that they select or deselect the underlying data that is displayed on device 10 and/or how that data is displayed. In other words, filters 110 are not literally for simply selecting a portion of the display of device 10 to view, as the simplified depiction in FIG. 1 may imply. Another user then wants to apply the same set of filters to the view (represented by hashing) in a corresponding app on device 50. The underlying views on devices 10 and 50 can be different (as in FIG. 1) or the same; regardless, the same filters can be applied on both devices according to embodiments discussed herein. If device 50, via one or more apps operating on device 50, is subscribed to the relevant content of device 10 and its app(s), the content from device 10 can be broadcast to device 50, such that the same filters of the view of device 10 are applied to the view of device 50.

Because system 100 broadcasts active content rather than simply sharing or mirroring a display, the filters on both devices 10 and 50, while initially synchronized, remain fully functional and editable. Thus, if a user of device 10 continues to manipulate content the view with other or additional filters, device 50 can remain synchronized with the other or additional filters so long as device 50 is subscribed to device 10. In some situations, a user of device 50 may wish to further manipulate the filters or content with other or additional filters and may do so. At some point, the user of device 10 may wish to subscribe to the content of device 50, such that device 50 then becomes the source device broadcasting its content to device 10.

Rather than simple mirroring, however, each user of each device can continue to change and customize the view and filters independently on each device. Thus, user interaction can be synchronized across devices, but users can independently decide which features will be synchronized across devices, to which views the features (filters) will be applied, and which will be kept independent. For example, a user of Device1 can apply particular filters and then select a "sync" option such that the current selected filters are synchronized and applied to any other subscribing devices.

The particular type of content, including the availability and implementation of various filters and other tools, can vary according to the type of app being used, the underlying data, a selected view, and the setting in which devices 10-40 and system 100 are used. For example, deployment of system 100 in a corporate or business setting could provide very different information, views, filters and tools than deployment of system in an educational setting. A retail organization could use filters related to retail markets, merchandizing, products and product lines, competitive and performance indicators, supply chain, logistics, and others. Thus, the particularities of the content and the features of the apps can vary significantly across various implementations and settings of system 100. Regardless of the setting or type of content, system 100 provides new ways for users of multiple devices collaborate and share information.

Figure 3:
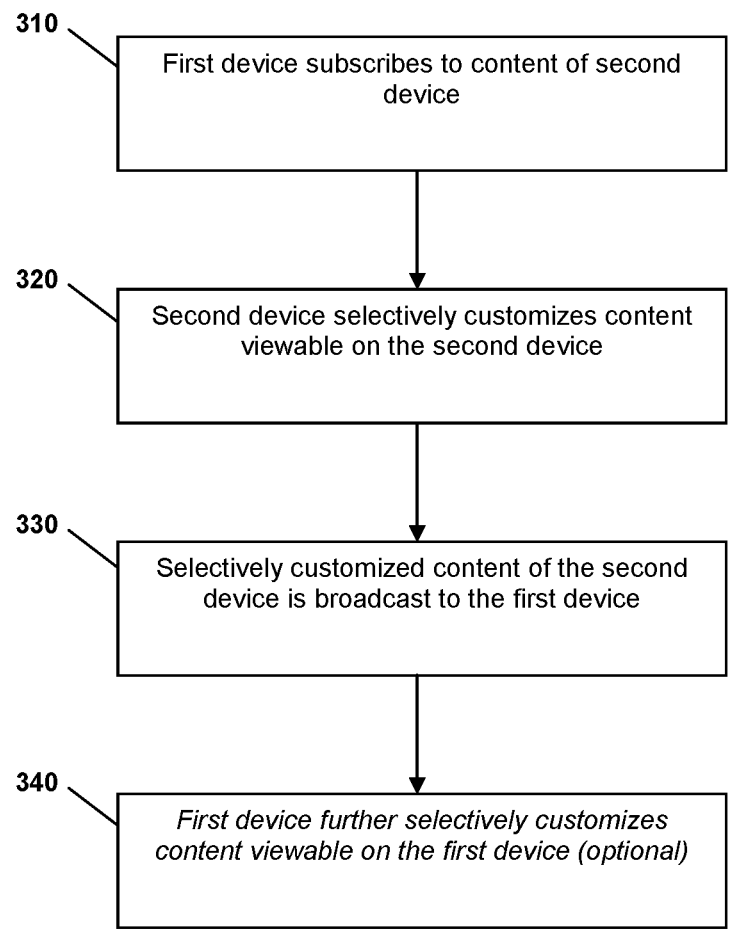
FIG. 3 is a flow chart of an embodiment of a method of multi-modal synchronization and interaction.

Referring then to FIG. 3, at 310 a first device subscribes to content of a second device in system 100. In embodiments, the subscribing can be done via an app operating on the first device, and the subscribing can be defined in terms of content of an app operating on the second device. The content can relate to filters, settings, tools, and other user selections for customizing views and ways in which data and information is selected, arranged and presented for viewing At 320, a user of the second device selectively customizes the filters and/or other content viewable on the second device. This can include choosing or manipulating data, data filters, views, and other features related to controlling the content and particular display of the content on a viewable portion of the second device.

At 330, the selectively customized content viewable on the second device is broadcast to and applied on the first device (or any other or additional devices subscribed to the content of the second device). In one embodiment, this comprises applying one or more filters, selected and applied to the view on the second device, on the view of the first device. The underlying views on the first and second devices need not be the same, and often will not be.

At 340, and optionally, the content broadcast to and displayed on the first device can be further selectively customized on the first device. In this way, broadcast content remains "active" and capable of further customization and manipulation, in contrast with conventional screen sharing or mirroring configurations, in which shared views are generally static on any devices receiving rather than sharing the view. In other embodiments, however, the first device can remain a passive recipient of the content selectively manipulated on and broadcast from the second device.

In various embodiments, system 100 and/or its components or subsystems can include computing devices, microprocessors, modules and other computer or computing devices, which can be any programmable device that accepts digital data as input, is configured to process the input according to instructions or algorithms, and provides results as outputs. In an embodiment, computing and other such devices discussed herein can be, comprise, contain or be coupled to a central processing unit (CPU) configured to carry out the instructions of a computer program. Computing and other such devices discussed herein are therefore configured to perform basic arithmetical, logical, and input/output operations.

Computing and other devices discussed herein can include memory. Memory can comprise volatile or non-volatile memory as required by the coupled computing device or processor to not only provide space to execute the instructions or algorithms, but also to provide the space to store the instructions themselves. In embodiments, volatile memory can include random access memory (RAM), dynamic random access memory (DRAM), or static random access memory (SRAM), for example. In embodiments, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the disclosure.

In embodiments, the system or components thereof can comprise or include various modules or engines, each of which is constructed, programmed, configured, or otherwise adapted to autonomously carry out a function or set of functions. The term "engine" as used herein is defined as a real-world device, component, or arrangement of components implemented using hardware, such as by an application specific integrated circuit (ASIC) or field-10 programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques.

Accordingly, each engine can be realized in a variety of physically realizable configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

The content accessed by and/or underlying the applications and other components of system 100 can reside in one or more databases. A database is a structured set of data held in a computer. Database software provides functionalities that allow building, modifying, accessing, and updating both databases and the underlying data. Databases and database software reside on database servers. Database servers are collections of hardware and software that provide storage and access to the database and enable execution of the database software.

As an example, one or more databases accessed by or relied upon by various components of system 100 may be present on a single computing device in an embodiment. In other embodiments, one or more databases may be present on one or more database systems physically separate from one another. Similarly, application server 210 and broadcast server 220 can be embodied on a single server or on multiple separate servers.

One embodiment comprises a multi-modal interaction system. This system can comprise a plurality of display devices, each display device comprising a web application and a screen on which information accessed via the web application is displayed, wherein the information displayed on the screen is customized by a plurality of user selectable filters that affect at least one of a source or type of data displayed as the information. The system can further comprise servers, including a web application server communicatively coupled with the web application of each of the plurality of display devices, and a content broadcasting server communicatively coupled with the web application of each of the plurality of display devices. The content broadcasting server can be configured to receive a subscription request from at least one of the plurality of display devices for another one of the plurality of display devices, receive the customized information displayed on the screen of the another one of the plurality of display devices, and broadcast the received customized information for display on the at least one of the plurality of display devices. In embodiments, both the customized information displayed on the screen of the another one of the plurality of display devices and the received customized information displayed on the at least one of the plurality of display devices are independently customizable by the plurality of user selectable filters.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A multi-modal interaction system comprising:
    a plurality of display devices, each display device comprising a web application and a screen on which information accessed via the web application is displayed, wherein the information displayed on the screen is customized by a plurality of user selectable filters that affect at least one of a source or type of data displayed as the information;
    a web application server communicatively coupled with the web application of each of the plurality of display devices; and a content broadcasting server communicatively coupled with the web application of each of the plurality of display devices, wherein the content broadcasting server is configured to
  receive a subscription request from at least one of the plurality of display devices for another one of the plurality of display devices,
  receive information related to ones of the plurality of user selectable filters selected on the another one of the plurality of display devices, and
  broadcast the received information for application to the information on the at least one of the plurality of display devices,
  wherein both the ones of the plurality of user selectable filters selected on the another one of the plurality of display devices and the received information applied to the information on the at least one of the plurality of display devices are independently customizable by the plurality of user selectable filters.

2. The system of claim 1, wherein each of the plurality of display devices is selected from the group consisting of: a TV, a computer, a laptop, a tablet, a smart phone, a mobile phone, and a smart watch.

3. The system of claim 1, wherein the web application server comprises an Apache Tomcat server.

4. The system of claim 1, wherein the content broadcasting server comprises a JavaScript server.

5. The system of claim 4, wherein the JavaScript server comprises a Node.js server.

6. The system of claim 1, wherein at least one of the plurality of user selectable filters relates to retail market information.

7. The system of claim 1, wherein at least one of the plurality of user selectable filters relates to merchandizing information.

8. The system of claim 1, wherein the web application on each of the plurality of display devices is an independent instance of the web application installed on one of the plurality of display devices.

9. The system of claim 1, wherein the content broadcasting server is configured to broadcast changes to the received information in real time.

10. A method of providing multi-modal interaction in a system comprising a plurality of display devices, the method comprising:
  receiving, by a content broadcasting server, a subscription request from at least one of a plurality of display devices for another one of the plurality of display devices;
  receiving, by the content broadcasting server, information related to ones of the plurality of user selectable filters selected on the another one of the plurality of display devices, wherein the plurality of user selectable filters relate to at least one of a source or type of data displayed; and
  broadcasting the received information for application to information on the at least one of the plurality of display devices, wherein both the ones of the plurality of user selectable filters selected on the another one of the plurality of display devices and the received information applied to the information on the at least one of the plurality of display devices are independently customizable by the plurality of user selectable filters.

11. The method of claim 10, further comprising installing an independent instance of a web application on each of the plurality of display devices, wherein displaying information on the screen of each of the plurality of display devices and facilitating use of the plurality of user selectable filters are implemented by the web application on each of the plurality of display devices.

12. The method of claim 11, further comprising facilitating communication with the web application of each of the plurality of display devices by a web application server.

13. The method of claim 10, wherein each of the plurality of display devices is selected from the group consisting of: a TV, a computer, a laptop, a tablet, a smart phone, a mobile phone, and a smart watch.

14. The method of claim 10, wherein the web application server comprises an Apache Tomcat server.

15. The method of claim 10, wherein the content broadcasting server comprises a Node.js JavaScript server.

16. The method of claim 10, wherein at least one of the plurality of user selectable filters relates to retail market information.

17. The method of claim 10, wherein at least one of the plurality of user selectable filters relates to merchandizing information.

18. The method of claim 10, further comprising:
  receiving, by the content broadcasting server, updated information from the another one of the plurality of display devices; and
  broadcasting the received updated information for application to the information on the at least one of the plurality of display devices.

19. The method of claim 10, further comprising:
  receiving, by the content broadcasting server, different information from a different one of the plurality of display devices; and
  broadcasting the received different information for application on ones of the plurality of display devices that are subscribed to the different one of the plurality of display devices.

* * * * *